United States Patent
Sasaki et al.

(10) Patent No.: US 11,323,165 B2
(45) Date of Patent: May 3, 2022

(54) WIRELESS COMMUNICATION DEVICE AND WIRELESS COMMUNICATION METHOD

(71) Applicant: NIPPON TELEGRAPH AND TELEPHONE CORPORATION, Tokyo (JP)

(72) Inventors: Hirofumi Sasaki, Yokosuka (JP); Hiroyuki Fukumoto, Yokosuka (JP); Doohwan Lee, Yokosuka (JP); Hiroyuki Shiba, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 45 days.

(21) Appl. No.: 16/650,332

(22) PCT Filed: Sep. 25, 2018

(86) PCT No.: PCT/JP2018/035538
§ 371 (c)(1),
(2) Date: Mar. 24, 2020

(87) PCT Pub. No.: WO2019/059409
PCT Pub. Date: Mar. 28, 2019

(65) Prior Publication Data
US 2021/0211168 A1  Jul. 8, 2021

(30) Foreign Application Priority Data
Sep. 25, 2017 (JP) .............................. JP2017-183845

(51) Int. Cl.
*H04B 7/06* (2006.01)
*H04B 7/0456* (2017.01)
*H04L 27/20* (2006.01)

(52) U.S. Cl.
CPC ......... *H04B 7/0615* (2013.01); *H04B 7/0456* (2013.01); *H04L 27/20* (2013.01)

(58) Field of Classification Search
CPC ...... H04B 7/0615; H04B 7/0456; H04L 27/20
(Continued)

(56) References Cited

U.S. PATENT DOCUMENTS

2017/0026095 A1\*  1/2017 Ashrafi ................. H04L 9/0852
2017/0331532 A1\*  11/2017 Le-Ngoc ............... H04B 7/0452
(Continued)

FOREIGN PATENT DOCUMENTS

WO    WO-2016022309 A1    2/2016

OTHER PUBLICATIONS

Y. Yan, et al., "High-capacity millimetre-wave communications with orbital angular momentum multiplexing", Nature Communications, 5:4876, Sep. 16, 2014.
(Continued)

*Primary Examiner* — Kwang B Yao
*Assistant Examiner* — Syed M Bokhari
(74) *Attorney, Agent, or Firm* — Harness, Dickey & Pierce, P.L.C.

(57) ABSTRACT

A wireless communication device includes a plurality of antenna elements; a modulation unit modulating signals including data in a plurality of first OAM modes having different real number values; a calculation unit calculating factors indicating weights corresponding to each of the signals in the plurality of first OAM modes modulated by the modulation unit for each of the plurality of antenna elements, based on information indicating a wireless environment of a counter wireless communication device that is a transmission destination of the data; and a transmission processing unit multiplexing each of the signals in the plurality of first OAM modes for each of the plurality of
(Continued)

antenna elements by using the factors, and outputting the signals obtained through multiplexing for each of the plurality of antenna elements to each of the plurality of antenna elements.

6 Claims, 9 Drawing Sheets

(58) Field of Classification Search
USPC .......................................................... 370/310
See application file for complete search history.

(56) References Cited

U.S. PATENT DOCUMENTS

| | | | | |
|---|---|---|---|---|
| 2018/0287263 | A1* | 10/2018 | Hirabe | H01Q 15/22 |
| 2019/0020434 | A1* | 1/2019 | Adachi | H04L 5/04 |
| 2019/0028165 | A1* | 1/2019 | Adachi | H01Q 19/17 |

OTHER PUBLICATIONS

A. Honda, et al., "Development of Wireless Communication Technologies for Future Multi-Gigabit Data Transmission", Proceedings of Asia-Pacific Microwave Conference 2014, pp. 483-485, 2014.

F. E. Mahmouli, et al., "4-Gbps Uncompressed Video Transmission over a 60-GHz Orbital Angular Momentum Wireless Channel", IEEE Wireless Communications Letters, vol. 2, No. 2, pp. 223-226, Apr. 2013.

J. Wang, et al., "Experimental Demonstration of Free-Space Optical Communications Using OFDM-QPSK/16QAM—Carrying Fractional Orbital Angular Momentum (OAM) Multiplexing", Optical Society of America, 2015.

K. Matsushima, et al., "Band-Limited Angular Spectrum Method for Numerical Simulation of Free-Space Propagation in Far and Near Fields", Optics Express, vol. 17, No. 22, p. 19662-19673, Oct. 26, 2009.

Opare, Kwasi A. et al., "Performance of an Ideal Wireless Orbital Angular Momentum Communication System Using Multiple-input Multiple-output Techniques", 2014 International Conference on Telecommunications and Multimedia (TEMU), Jun. 30, 2014, pp. 144-149.

Edfors, Ove et al., "Is Orbital Angular Momentum (OAM) Based Radio Communication an Unexploited Area?", IEEE Transactions on Antennas and Propagation, vol. 60, issue 2, Feb. 2012, pp. 1126-1131.

Fukumoto, Hiroyuki et al., "A Study of Beam Expansion Mitigation Method in Orbital Angular Momentum (OAM) based Wireless Communications", Proceedings of IEICE general conference 2016: Communication 1, Mar. 1, 2016.

International Search Report (English and Japanese) issued in PCT/JP2018/035538, dated Dec. 18, 2018; ISA/JP.

* cited by examiner

FIG. 3
(a) 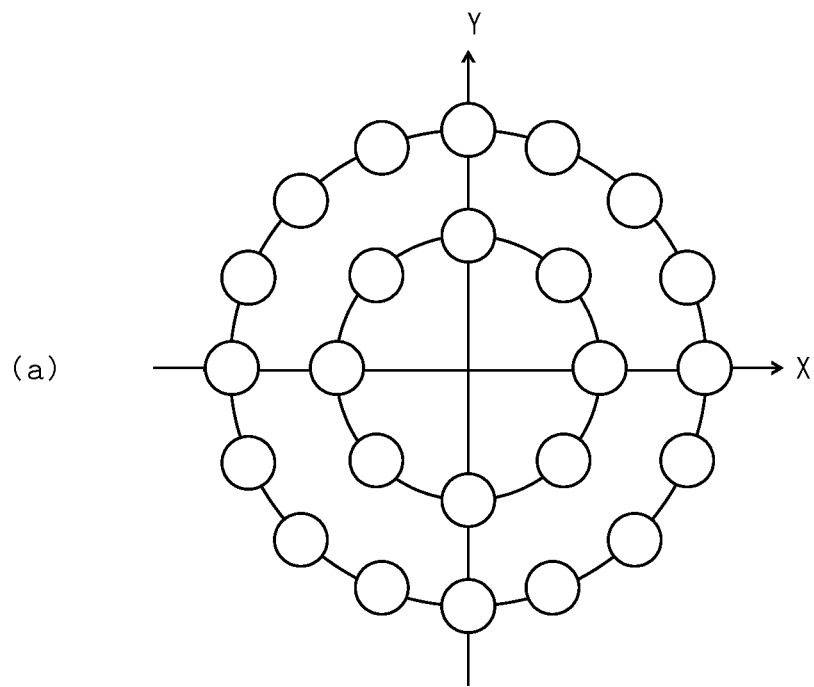
(b) 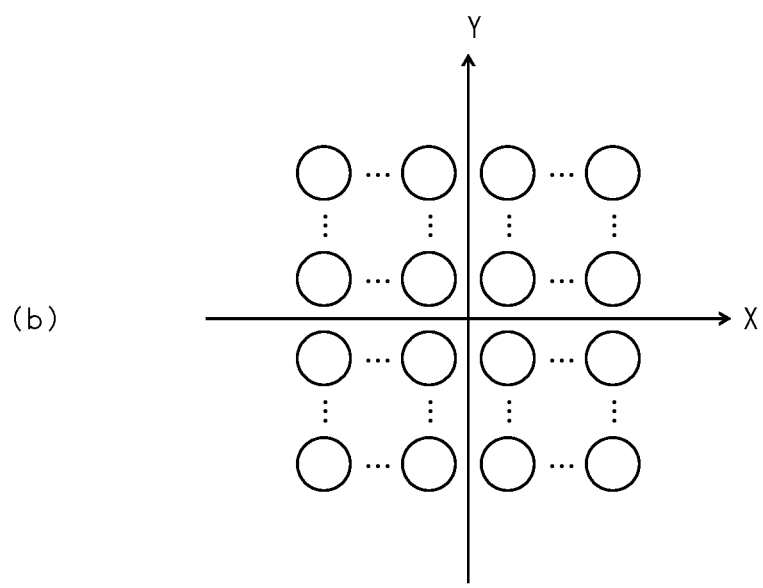

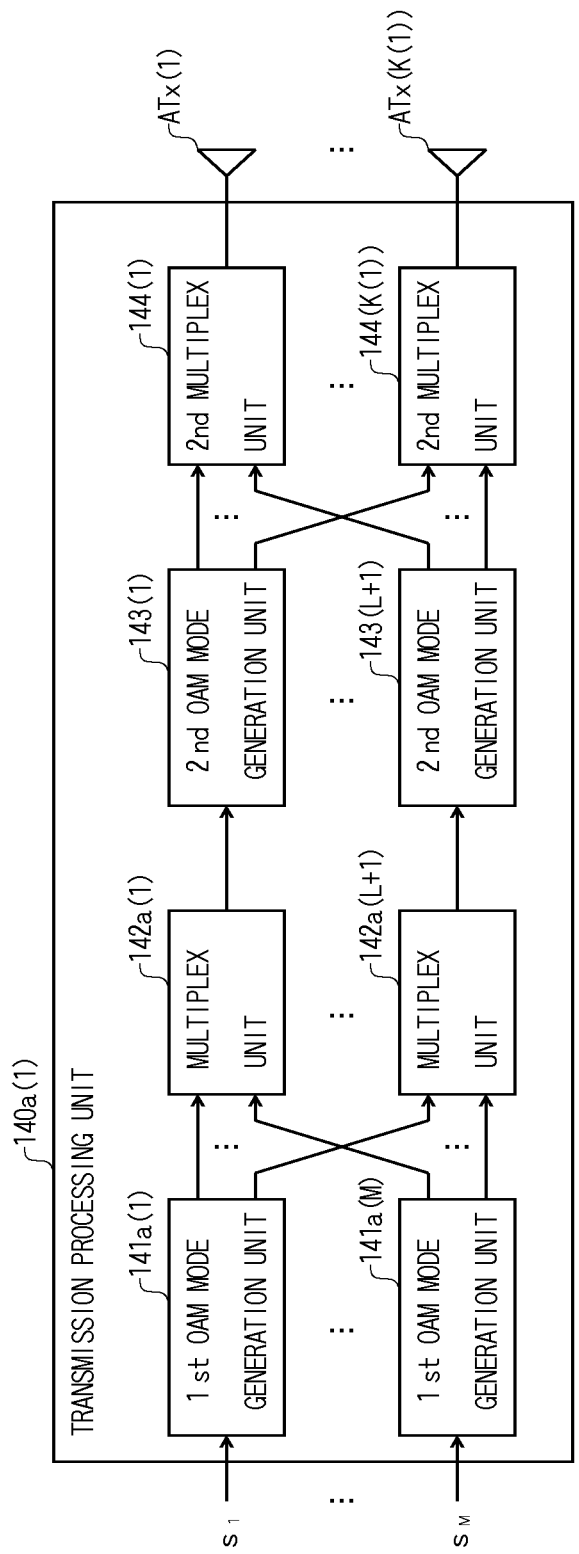
F I G. 8

WIRELESS COMMUNICATION DEVICE AND WIRELESS COMMUNICATION METHOD

CROSS REFERENCE TO RELATED APPLICATION

This application is a U.S. National Stage application claiming the benefit of prior filed International Application Number PCT/JP2018/035538, filed on Sep. 25, 2018, in which the International Application claims priority from Japanese Patent Application Number 2017-183845, filed on Sep. 25, 2017, the entire contents of which are incorporated herein by reference.

TECHNICAL FIELD

The present invention relates to a wireless communication device and a wireless communication method of subjecting a radio signal to spatial multiplex transmission by using orbital angular momentum (OAM) of an electromagnetic wave.

BACKGROUND ART

In a wireless communication system, there has been proposed a technique for increasing a transmission capacity by multiplexing electromagnetic waves by using OAM (for example, refer to Non-Patent Document 1). In an electromagnetic wave using OAM, an equiphase surface thereof is distributed in a spiral form along a rotational direction perpendicular to an axis with a propagation direction as the center of the axis. In this case, a mode in which a spiral cycle of the equiphase surface is $2\pi \times I$ is referred to as an OAM mode I.

Electromagnetic waves in the OAM mode I having different integer values have orthogonality in the rotational direction, and can thus be spatially multiplexed. Thus, even though the electromagnetic waves in the OAM modes I having different integer values are simultaneously transmitted, the electromagnetic wave can be demultiplexed in each OAM mode I on a reception side. Consequently, there has been proposed a technique in which electromagnetic waves in a plurality of OAM modes I are multiplexed and transmitted by using an antenna such as a circular array antenna or a spiral phase plate (SPP) (for example, refer to Non-Patent Documents 2 and 3).

In addition, a technique of transmitting electromagnetic waves in the OAM mode I having a real number value such as 0.5 or 1.5 has been proposed (for example, refer to Non-Patent Document 4).

Non-Patent Document 1: Y. Yan, et al., "High-capacity millimetre-wave communications with orbital angular momentum multiplexing", Nature Communications, 5,4876, 2014.

Non-Patent Document 2: A. Honda, et al., "Development of Wireless Communication Technologies for Future Multi-Gigabit Data Transmission", in Proceedings of APMC 2014.

Non-Patent Document 3: F. E. Mahmouli, et al., "4-Gbps Uncompressed Video Transmission over a 60-GHz Orbital Angular Momentum Wireless Channel", IEEE wireless communications letters, Vol. 2, No. 2, pp. 223-226, 2013.

Non-Patent Document 4: J. Wang, et al., "Experimental Demonstration of Free-Space Optical Communications Using OFDM-QPSK/16QAM-Carrying Fractional Orbital Angular Momentum (OAM) Multiplexing", in proc. of OFC 2015.

DISCLOSURE

Problems to be Solved

A beam pattern of an antenna of a transmission side radiating an electromagnetic wave spreads in proportion to an absolute value of the OAM mode I. In other words, the antenna of the transmission side is reduced in directivity in a direction of an antenna included in a wireless communication device of a reception side as an absolute value of the OAM mode I increases, and thus reception power in the wireless communication device of the reception side is reduced. Thus, there is a case where a wireless communication device of the transmission side obtains reception power required for wireless communication, and the number of OAM modes used for multiplex is restricted.

A proposition of the present invention is to provide a wireless communication device and a wireless communication method capable of improving throughput by multiplexing electromagnetic waves in a larger number of OAM modes than in the related art.

Means for Solving the Problems

According to a first embodiment, there is provided a wireless communication device including a plurality of antenna elements; a modulation unit modulating signals including data in a plurality of first orbital angular momentum (OAM) modes having different real number values; a calculation unit calculating factors indicating weights corresponding to each of the signals in the plurality of first OAM modes modulated by the modulation unit for each of the plurality of antenna elements, based on information indicating a wireless environment of a counter wireless communication device that is a transmission destination of the data; and a transmission processing unit multiplexing each of the signals in the plurality of first OAM modes for each of the plurality of antenna elements by using the factors, and outputting the signals obtained through multiplexing for each of the plurality of antenna elements to each of the plurality of antenna elements.

The wireless communication device according to the first embodiment may further include a reception processing unit subjecting a received signal which is received from the counter wireless communication device to phase rotation in a phase amount corresponding to each of the plurality of first OAM modes, and demultiplexing the received signal into each of signals in the plurality of first OAM modes; and a demodulation unit demodulating the demultiplexed signals in the plurality of first OAM modes.

The wireless communication device according to the first embodiment may further include a light collector collecting electromagnetic waves radiated from the plurality of antenna elements at a position of the counter wireless communication device.

In the wireless communication device according to the first embodiment, the plurality of antenna elements may form a plurality of circular array antennae disposed in a concentric shape on a two-dimensional plane perpendicular to a direction in which the counter wireless communication device is provided.

The wireless communication device according to the first embodiment may further include a plurality of the transmission processing units being disposed for each of the plurality of circular array antennae, in which the calculation unit may calculate the factors for each of the plurality of circular array antennae, and each of the plurality of transmission processing units may multiplex each of the signals in the plurality of first OAM modes for each of the disposed circular array antennae by using the factors, and executes weighting of a phase corresponding to a second OAM mode having an integer value, set in the disposed circular array antenna, on the multiplexed signals.

According to a second embodiment, there is provided a wireless communication method for a wireless communication device including a plurality of antenna elements, the wireless communication method includes modulating signals including data in a plurality of first OAM modes having different real number values; calculating factors indicating weights corresponding to each of the modulated signals in the plurality of first OAM modes for each of the plurality of antenna elements, based on information indicating a wireless environment of a counter wireless communication device that is a transmission destination of the data; and multiplexing each of the signals in the plurality of first OAM modes for each of the plurality of antenna elements by using the factors, and outputting the signals obtained through multiplexing for each of the plurality of antenna elements to each of the plurality of antenna elements.

Effect

According to the present invention, it is possible to improve throughput by multiplexing electromagnetic waves in a larger number of OAM modes than in the related art.

BRIEF DESCRIPTION OF THE DRAWINGS

FIG. 3 is a diagram illustrating an example of disposition of antenna elements in the transmitting station illustrated in FIG. 2.

FIG. 8 is a diagram illustrating an example of a transmission processing unit illustrated in FIG. 7.

DETAILED DESCRIPTION OF THE EMBODIMENTS

Hereinafter, embodiments will be described with reference to the drawings.

Figure 1:
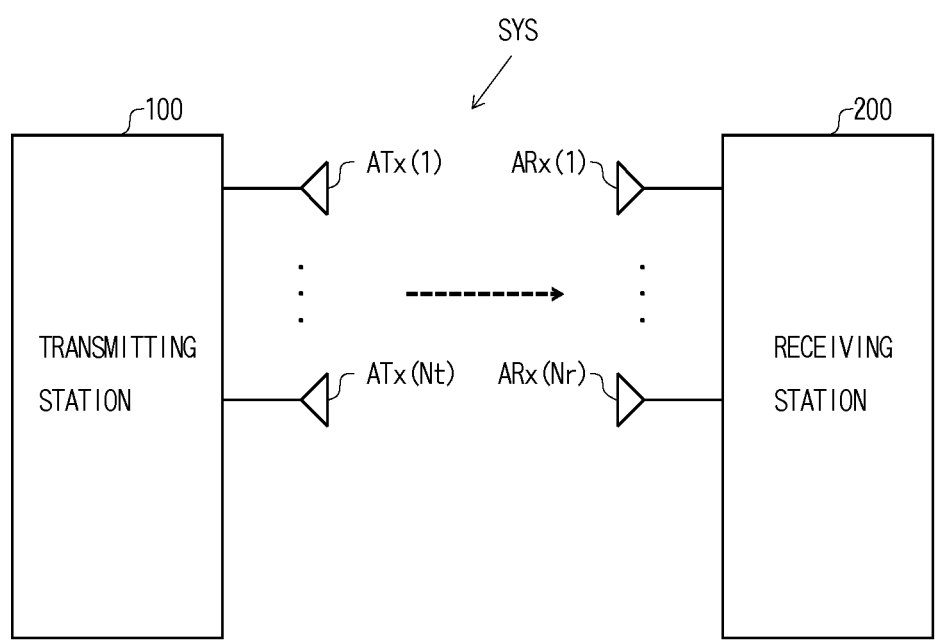
FIG. 1 is a diagram illustrating an embodiment of a wireless communication system.

FIG. 1 illustrates an embodiment of a wireless communication system.

A wireless communication system SYS illustrated in FIG. 1 includes a transmitting station 100 and a receiving station 200. The transmitting station 100 multiplexes electromagnetic waves in a plurality of OAM modes having different real number values, and transmits the multiplexed electromagnetic waves to the receiving station 200 by using a transmitting antenna including Nt antenna elements ATx (ATx(1) to ATx(Nt))

The receiving station 200 receives the electromagnetic waves transmitted from the transmitting station 100 by using a receiving antenna including Nr antenna elements ARx (ARx(1) to ARx(Nr)).

The transmitting station 100 may have a function of the receiving station 200, and the receiving station 200 may have a function of the transmitting station 100. Consequently, the transmitting station 100 and the receiving station 200 can execute wireless communication with each other in a bidirectional manner. The transmitting station 100 is an example of a wireless communication device, and the receiving station 200 is an example of a counter wireless communication device.

Figure 2:
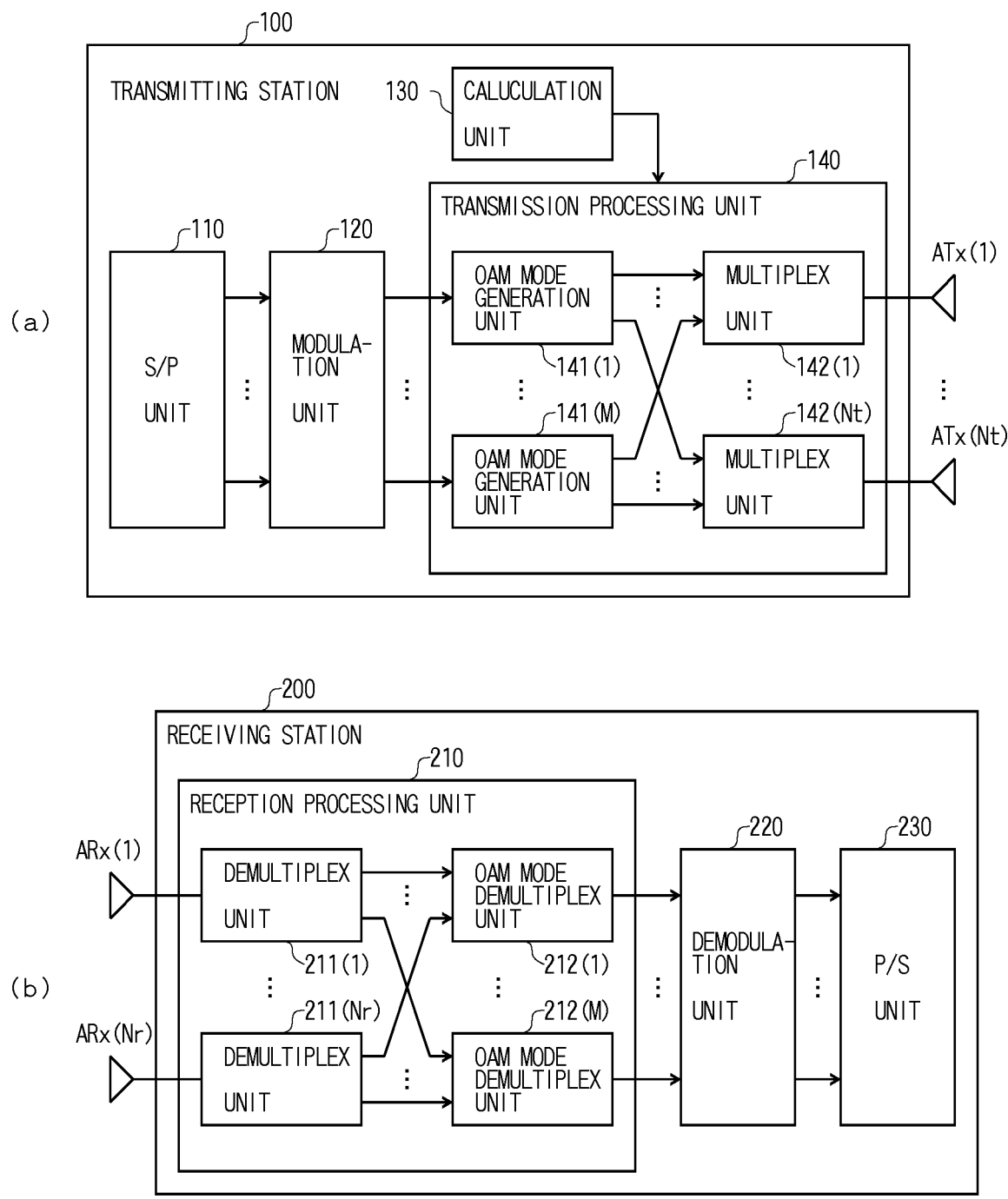
FIG. 2 is a diagram illustrating examples of a transmitting station and a receiving station illustrated in FIG. 1.

FIG. 2 illustrates examples of the transmitting station 100 and the receiving station 200 illustrated in FIG. 1. (a) of FIG. 2 illustrates the transmitting station 100, and (b) of FIG. 2 illustrates the receiving station 200.

The transmitting station 100 includes a serial-to-parallel (S/P) unit 110, a modulation unit 120, a calculation unit 130, a transmission processing unit 140, and the Nt antenna elements ATx.

The S/P unit 110 receives a signal including data transmitted from a portable communication terminal such as a smart phone or a tablet terminal or a signal including data from a network via an input interface included in the transmitting station 100 or a network interface. The S/P unit 110 converts the received signal (hereinafter, also referred to as a "transmission signal sequence") from a serial signal into M parallel signals. The S/P unit 110 outputs M transmission signal sequences converted into parallel signals to the modulation unit 120.

The modulation unit 120 performs modulation such as a phase shift keying (PSK) method or a quadrature amplitude modulation (QAM) method on each of M parallel transmission bit strings received from the S/P unit 110, and thus generates M transmission signal sequences. The modulation unit 120 outputs the generated M transmission signal sequences to the transmission processing unit 140. Here, an m-th transmission signal sequence output from the modulation unit 120 is transmitted by using an OAM mode $I_m$ (where m is an integer of 1 to M). The transmission process will be described later.

An interval between the OAM modes $I_m$ is set to a fraction such as "⅓" or a value smaller than 1, such as "0.2" or "0.5". In other words, the transmitting station 100 transmits transmission signal sequences in M OAM modes $I_m$ set to an interval of a value smaller than 1. Consequently, when a range of an OAM mode for transmission is identical, the transmitting station 100 can modulate transmission signal sequences in more OAM modes $I_m$ than when a plurality of OAM modes are set at an interval of an integer value such as "1". An absolute value of the OAM mode $I_m$ is set to a small value, and thus the transmitting station 100 can suppress spreading of a beam pattern due to the Nt antenna elements ATx. An inequal interval may be selected as an interval between the OAM modes $I_m$.

The transmitting station 100 may include M modulation units 120. In this case, each of the M modulation units 120 sets any one of M OAM modes $I_m$ having different real number values therein, receives any one of M transmission signal sequences from the S/P unit 110, and transmits the received transmission signal sequence in the set OAM mode $I_m$.

The calculation unit 130 is a processor such as a central processing unit (CPU) included in the transmitting station 100, and calculates a weighting factor corresponding to each of the transmission signal sequences in the M OAM modes $I_m$ modulated by the modulation unit 120 for each of the Nt antenna elements ATx based on information indicating a wireless environment of the receiving station 200 that is a transmission destination of the transmission signal sequences. The calculation unit 130 outputs the calculated weighting factors to the transmission processing unit 140. An operation of the calculation unit 130 and a wireless environment of the receiving station 200 will be described in FIG. 4.

The transmission processing unit 140 has, for example, M OAM mode generation units 141 (141(1) to 141(M)) and Nt multiplex units 142 (142(1) to 142(Nt)). Each of the M OAM mode generation units 141 weights the transmission signal sequence received from the modulation unit 120 for each of the antenna elements ATx by using the weighting factor calculated by the calculation unit 130. Each of the M OAM mode generation units 141 outputs the transmission signal sequence weighted for each of the antenna elements ATx to the multiplex unit 142 coupled to the corresponding antenna element ATx. Each of the M multiplex units 142 multiplexes the transmission signal sequences weighted by the M respective OAM mode generation units 141, and outputs the multiplexed transmission signal sequences to the antenna element ATx. Operations of the OAM mode generation units 141 and the multiplex units 142 will be described in FIG. 4.

The Nt antenna elements ATx are an array antenna disposed on a plane perpendicular to a direction in which an electromagnetic wave radiated toward the receiving station 200 propagates. The Nt antenna elements ATx may have any directivity and polarization characteristics. An array antenna using the Nt antenna elements ATx will be described in FIG. 3.

The receiving station 200 includes the Nr antenna elements ARx, a reception processing unit 210, a demodulation unit 220, and a parallel-to-serial (P/S) unit 230.

The Nr antenna elements ARx are disposed at an equal interval on a circumference with a radius Rrx in a plane perpendicular to a direction in which an electromagnetic wave radiated from the transmitting station 100 propagates, and thus form one circular array antenna. The Nr antenna elements ARx receive electromagnetic waves having OAM, radiated from the transmitting station 100, and output received signals of the received electromagnetic waves having OAM to the reception processing unit 210.

The reception processing unit 210 has, for example, Nr demultiplex units 211 (211(1) to 211(Nr)) and M OAM mode demultiplex units 212 (212 (1) to 212(M)). Each of the Nr demultiplex units 211 distributes, for example, received signals that are received via the antenna element ARx to the M OAM mode demultiplex units 212, respectively. Each of the M OAM mode demultiplex units 212 sets one of the M OAM modes $I_m$ having different real number values therein, and executes phase rotation in a predetermined phase amount corresponding to the set OAM mode $I_m$ on the received signals demultiplexed by the respective Nr demultiplex units 211. Consequently, each of the M OAM mode demultiplex units 212 separates a transmission signal sequence in the set OAM mode $I_m$ from the received signals. Each of the M OAM mode demultiplex units 212 outputs the separated transmission signal sequence in the OAM mode $I_m$ to the demodulation unit 220. Operations of the reception processing unit 210 and the OAM mode demultiplex units 212 will be described with reference to FIG. 4.

The demodulation unit 220 executes a demodulation process on each of the transmission signal sequences in the M OAM modes $I_m$ received from the reception processing unit 210.

The P/S unit 230 converts parallel signals that are the M transmission signal sequences received from the demodulation unit 220 into a serial signal. The receiving station 200 outputs the transmission signal sequences converted into the serial signal to an external portable communication terminal or a network via an output interface or the like included in the receiving station 200.

The Nr antenna elements ARx form a single circular array antenna disposed on a circumference with any radius in a plane perpendicular to a direction in which an electromagnetic wave radiated from the transmitting station 100 propagates. The antenna elements ARx may have any directivity and polarization characteristics.

FIG. 3 illustrates an example of disposition of the antenna elements ATx in the transmitting station 100 illustrated in FIG. 2. (a) of FIG. 3 illustrates a case of a plurality of array antennae (hereinafter, also referred to as "multiple circular array antennae") in which the Nt antenna elements ATx are disposed in a concentric shape. (b) of FIG. 3 illustrates a case of an array antenna (hereinafter, also referred to as a "grid-shaped array antenna") in which the Nt antenna elements ATx are disposed in a grid shape. FIG. 3 illustrates disposition of the Nt antenna elements ATx on an XY plane viewed from a positive Z axis direction (that is, the receiving station 200 side) when a direction in which an electromagnetic wave radiated from the transmitting station 100 propagates toward the receiving station 200 is set to a Z axis direction. In FIG. 3, each of the Nt antenna elements ATx is indicated by a circular mark.

FIG. 3 illustrates the multiple circular array antennae or the grid-shaped array antenna, but the Nt antenna elements ATx may be randomly disposed on the XY plane.

When the transmitting station 100 as a receiving station receives electromagnetic waves from the receiving station 200, and the Nt antenna elements ATx are disposed to form the multiple circular array antennae as illustrated in (a) of FIG. 3, the transmitting station 100 receives the electromagnetic waves from the receiving station 200 by using any one circular array antenna among the multiple circular array antennae. As illustrated in (b) of FIG. 3, when the Nt antenna elements ATx are disposed to form the grid-shaped array antenna, the transmitting station 100 receives electromagnetic waves from the receiving station 200 by using a plurality of antenna elements ATx present on a circumference having a predetermined radius in the grid-shaped array antenna as a single circular array antenna.

A light collector such as a dielectric lens or a paraboloidal reflector having an optical axis in a direction in which an electromagnetic wave propagates may be disposed in at least one of the transmitting station 100 and the receiving station 200 illustrated in FIG. 1 such that electromagnetic waves radiated from the Nt antenna elements ATx are collected at a position of the receiving station 200, and are efficiently received by the Nr antenna elements ARx of the receiving station 200. Consequently, the wireless communication system SYS can suppress spreading of a beam pattern due to the Nt antenna elements ATx.

Figure 4:
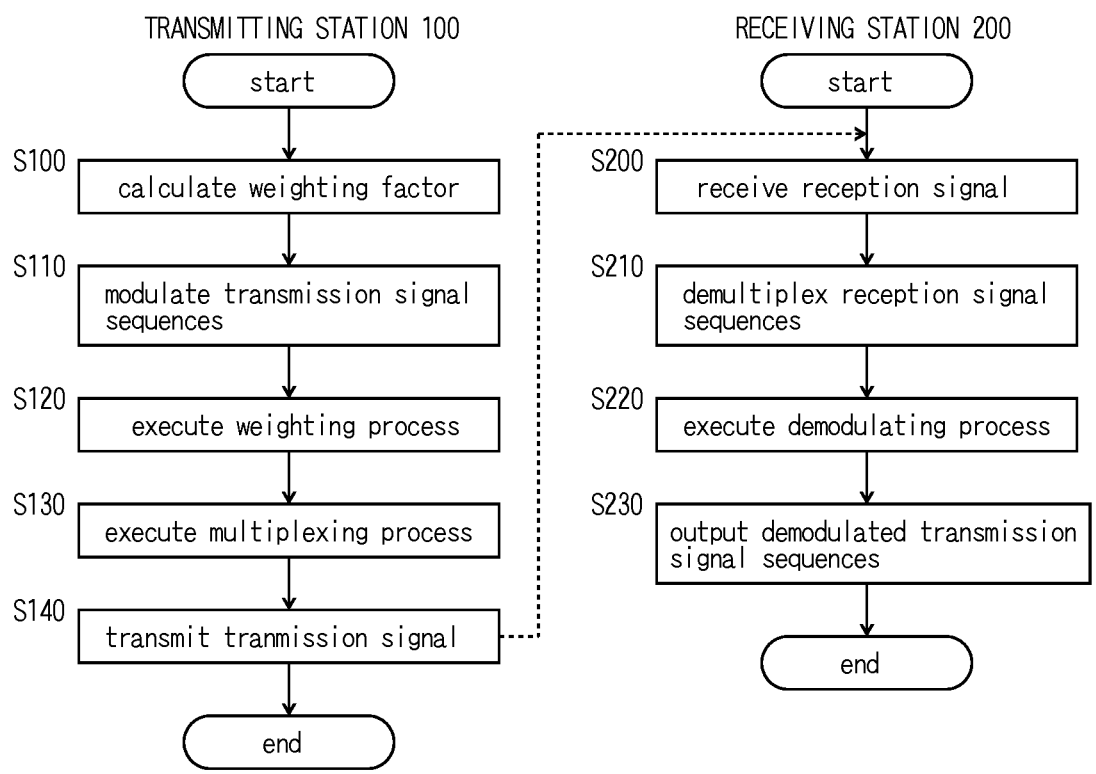
FIG. 4 is a diagram illustrating an example of a communication process in the wireless communication system illustrated in FIG. 1.

FIG. 4 illustrates an example of a communication process in the wireless communication system SYS illustrated in FIG. 1. In the process illustrated in FIG. 4, processes in step S100 to step S140 are executed by the transmitting station 100. Processes in step S200 to step S230 are executed by the receiving station 200. In other words, FIG. 4 illustrates an embodiment of a communication method.

In step S100, the calculation unit 130 calculates a weighting factor corresponding to each of transmission signal sequences in M OAM modes $I_m$ modulated by the modulation unit 120 for each of the Nt antenna elements ATx, based on information indicating a wireless environment of the receiving station 200 that is a transmission destination of the transmission signal sequences. For example, when the transmitting station 100 transmits a transmission signal sequence $s_m$ to the receiving station 200 by using the OAM mode $I_m$, a beam pattern $u_m(x,y,zd)$ formed at a position of the receiving station 200 is represented as in Equation (1).

$$u_m(x,y,zd) = u_m(r,\phi,zd) = \exp(iI_m\phi) \cdot f(r) \quad (1)$$

zd indicates a distance from the transmitting station 100 to the receiving station 200. The transmitting station 100 is set to the origin of an XYZ coordinate system. (r,ϕ,zd) is an expression corresponding to a cylindrical coordinate system of (x,y,zd), and x is r cos ϕ and y is r sin ϕ. In addition, $\exp(iI_m\phi)$ indicates a phase distribution in the OAM mode $I_m$. Further, f(r) is a function indicating a beam distribution shape in an r direction (diameter direction). In addition, i indicates an imaginary number unit.

The beam pattern $u_m(r,\phi,0)$ in the transmitting station 100 is associated with the beam pattern $u_m(r,\phi,zd)$ in the receiving station 200 in Equation (1) as in Equation (2) by using the distribution in Equation (1) based on, for example, K. Matsushima, et al., "Band-Limited Angular Spectrum Method for Numerical Simulation of Free-Space Propagation in Far and Near Fields", Optics Express, Vol. 17, No. 22, pp. 19662-19673, 2009.

$$u_m(r,\phi,0) = u_m(r,\phi,zd) * h(r,\phi,-zd) \quad (2)$$

Here, h(r,ϕ,−zd) indicates a response of a propagation channel between the transmitting station 100 and the receiving station 200.

The calculation unit 130 acquires, as information indicating a wireless environment, for example, the distance zd between the transmitting station 100 and the receiving station 200, a radius of a single circular array antenna formed by the Nr antenna elements ARx of the receiving station 200, and the function f(r) indicating a beam shape, from the receiving station 200 via a network or the like. The calculation unit 130 calculates a factor $w_m$ with which each of the antenna elements ATx is weighted by using Equation (3) such that a beam pattern due to the Nt antenna elements ATx of the transmitting station 100 satisfies Equation (2) by using the acquired information.

$$w_m = (w_{m,1}, \cdots, w_{m,Nt})^T \quad (3)$$
$$= A_m(u_m(r_1, \phi_1, 0), \cdots, u_m(r_{Nt}, \phi_{Nt}, 0))T$$

Here, $A_m$ is any constant, and is determined as appropriate. Hereinafter, $A_m$ is set to "1". In addition, xn and yn indicate coordinates of a position on the XY plane on which the antenna elements ATx(n) are disposed (where n is an integer of 1 to Nt). Further, $r_n$ is $(x_n^2+y_n^2)^{1/2}$, and ϕn is $sgn(y_n) \times \cos^{-1}(x_n/r_n)$. In addition, sgn is a sign function.

The information regarding the wireless environment of the receiving station 200 may be input in advance by a manager managing the wireless communication system SYS, and may be stored in a storage device such as a hard disk device or a memory included in the transmitting station 100.

Next, in step S110, the modulation unit 120 modulates each of the transmission bit sequences received from the S/P unit 110 by using PSK or QAM, and thus generates M transmission signal sequences $s_m$ (where m is an integer of 1 to M). The modulation unit 120 outputs the generated M transmission signal sequences $s_m$ to the transmission processing unit 140.

Next, in step S120, the OAM mode generation unit 141(m) of the transmission processing unit 140 executes a weighting process on the transmission signal sequence $s_m$ generated in step S110 by using the weighting factor $w_m$ calculated in step S100, represented in Equation (3), for each of the M antenna elements ATx, and thus generates the OAM mode $I_m$. The OAM mode generation unit 141(m) outputs the weighted transmission signal sequence $w_{m,n} \cdot s_m$ to the Nt multiplex units 142, respectively (where n is an integer of 1 to Nt).

Next, in step S130, the multiplex unit 142(n) multiplexes the transmission signal sequence $w_{m,n} \cdot s_m$ weighted in step S120 by using Equation (4) (where n is an integer of 1 to Nt).

$$ss_n = \sum_{m=1}^{M} w_{m,n} \cdot s_m \quad (4)$$

Next, in step S140, the multiplex unit 142(n) outputs a transmission signal sequence $SS_n$ obtained through multiplexing in step S130 to the antenna element ATx(n), and transmits a transmission signal of the multiplexed transmission signal sequence $SS_n$ to the receiving station 200. Through the above transmission, a beam pattern in which the OAM mode $I_1$ to the OAM mode $I_M$ are combined with each other is obtained at positions of the antenna elements ARx of the receiving station 200.

The transmitting station 100 finishes the transmission process. When a transmission signal sequence is received from the outside, the transmitting station 100 repeatedly executes the processes in step S100 to step S140. The process in step S100 may be executed initially only once, and may be omitted for the second and subsequent times.

In step S200, the reception processing unit 210 of the receiving station 200 receives reception signals of the transmission signal sequences transmitted in step S140 via the Nr antenna elements ARx. The demultiplex unit 211($n_r$) of the reception processing unit 210 distributes a received signal $tn_r$ of the received transmission signal sequence to the M OAM mode demultiplex units 212 (where $n_r$ is an integer of 1 to Nr). The received signal $tn_r$ is represented as in Equation (5).

$$tn_r = f(Rr) \cdot \sum_{m=1}^{M} \exp(iI_m 2\pi \cdot n_r/Nr) \cdot s_m \quad (5)$$

Rr indicates a radius of a single circular array antenna having the Nr antenna elements ARx.

Next, in step S210, the OAM mode demultiplex unit 212(m) executes phase rotation in a phase amount corresponding to the OAM mode $I_m$ on the received signal $tn_r$ received from the demultiplex unit 211($n_r$), and thus combines Nr received signals $tn_r$ with each other. For example, the OAM mode demultiplex unit 212(m) executes phase rotation in a phase amount of exp(-i$l_m$2π·$n_r$/Nr) on the received signal tn$_r$ received from the demultiplex unit 211 ($n_r$), and thus combines Nr received signals tn$_r$ obtained through phase rotation with each other. A signal st(m) combined by the OAM mode demultiplex unit 212(m) is represented as in Equation (6).

$$st(m) = \sum_{n_r=1}^{Nr} tn_r \cdot \exp(-il_m 2\pi \cdot n_r / Nr) \quad (6)$$

$$= f(Rr) \cdot Nr \cdot s_m + f(Rr) \cdot \sum_{m' \neq m} \exp\left(\frac{i(l_{m'} - l_m)2\pi m'}{Nr}\right) \cdot s_{m'}$$

In other words, the Nr received signals tn$_r$ are combined in the OAM mode I$_m$ with each other in phase, and, thus, in the combined signal st(m), the intensity of the transmission signal sequence in the OAM mode I$_m$ indicated by the first term of Equation (6) sufficiently increases more than those of transmission signal sequences in other OAM modes in the second term. Consequently, the OAM mode demultiplex unit 212(m) can separate a transmission signal sequence transmitted in the OAM mode I$_m$ having a real number value from the received signals. The OAM mode demultiplex unit 212(m) outputs the separated transmission signal sequence in the OAM mode I$_m$ to the demodulation unit 220.

Next, in step S220, the demodulation unit 220 executes a demodulation process on each of the transmission signal sequences in the M OAM modes I$_m$ separated in step S210.

Next, in step S230, the P/S unit 230 converts parallel signals of the M transmission signal sequences demodulated in step S220 into a serial signal. The receiving station 200 outputs the transmission signal sequences converted into the serial signal to an external portable communication terminal or a network via an output interface or the like included in the receiving station 200.

The receiving station 200 finishes the reception process. When transmission signal sequences are received from the transmitting station 100, the receiving station 200 repeatedly executes the processes in step S200 to step S230.

In the embodiment illustrated in FIGS. 1 to 4, the transmitting station 100 sends respective transmission signal sequences in M OAM modes I$_m$ having real number values smaller than 1 as an interval between modes, multiplexes the transmission signal sequences modulated in the M OAM modes I$_m$, and transmits the multiplexed transmission signal sequences to the receiving station 200. In other words, when a range of an OAM mode for transmission is identical, the transmitting station 100 can modulate transmission signal sequences in more OAM modes I$_m$ than when a plurality of OAM modes are set at an interval of an integer value by using the M OAM modes I$_m$ including a non-integer order set to an interval smaller than 1 and an integer order. An absolute value of the OAM mode I$_m$ is set to a small value, and thus the transmitting station 100 can suppress spreading of a beam pattern due to the Nt antenna elements ATx.

For example, in the related art such as Non-Patent Document 4, even when of OAM modes enabling reception power required for communication to be secured have limits of five-mode multiplex such as −2, −1, 0, 1, and 2, the transmitting station 100 can realize nine-mode multiplex such as −2.0, −1.5, −1.0, −0.5, 0, 0.5, 1.0, 1.5, and 2.0 as OAM modes, and can thus increase a multiplex number to 1.8 times.

The receiving station 200 executes phase rotation in a phase amount corresponding to the OAM mode I$_m$ on a received signal that is received from the transmitting station 100, combines received signals that are received with each other in phase, and can thus separate transmission signal sequences in the respective OAM modes I$_m$. As mentioned above, the wireless communication system SYS can multiplex electromagnetic waves in a larger number of OAM modes than in the related art while suppressing spreading of a beam pattern, and can thus improve throughput.

Figure 5:
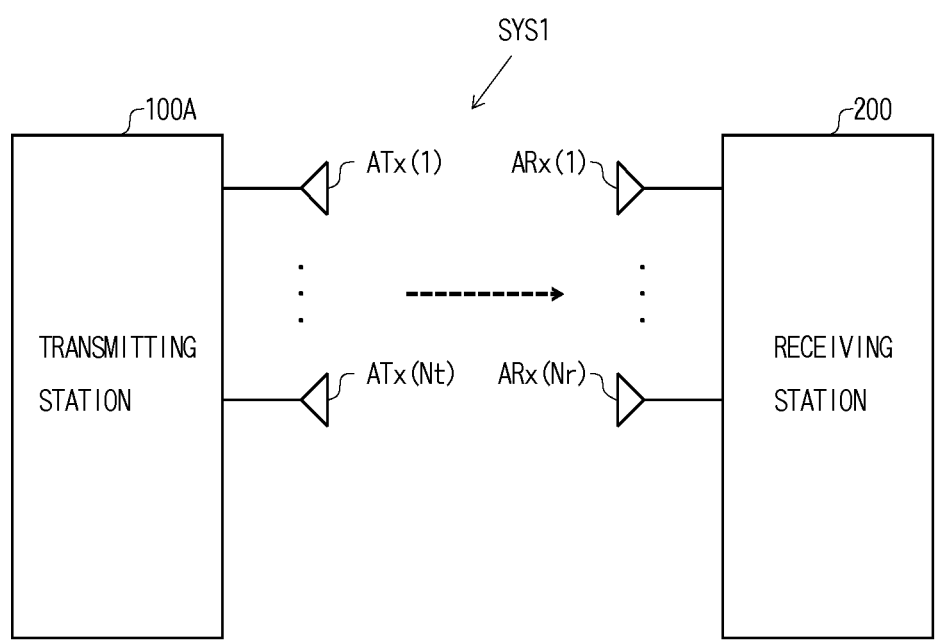
FIG. 5 is a diagram illustrating another embodiment of the wireless communication system.

FIG. 5 illustrates another embodiment of a wireless communication system. In addition, elements having functions identical or similar to the elements described in FIG. 1 are given identical or similar reference numerals, and detailed description thereof will be omitted.

A wireless communication system SYS1 illustrated in FIG. 5 includes a transmitting station 100A and a receiving station 200. The transmitting station 100A transmits electromagnetic waves multiplexed in a plurality of OAM modes having different real number values to the receiving station 200 by using a transmitting antenna including Nt antenna elements ATx. The receiving station 200 receives the electromagnetic waves transmitted from the transmitting station 100A by using a receiving antenna including Nr antenna elements ARx.

In the wireless communication system SYS1, the transmitting station 100A combines OAM modes having different integer values so as to approximately generate a plurality of OAM modes having real number values, and transmits multiplexed electromagnetic waves to the receiving station 200. Consequently, a transmitting station and a receiving station of an existing wireless communication system can be operated as the transmitting station 100A and the receiving station 200 of the wireless communication system SYS1.

The transmitting station 100A may have a function of the receiving station 200, the receiving station 200 may have a function of the transmitting station 100A, and thus a wireless communication process may be executed in a bidirectional manner between the transmitting station 100A and the receiving station 200.

The Nt antenna elements ATx are disposed to form, for example, multiple circular array antennae as illustrated in (a) of FIG. 3.

Figure 6:
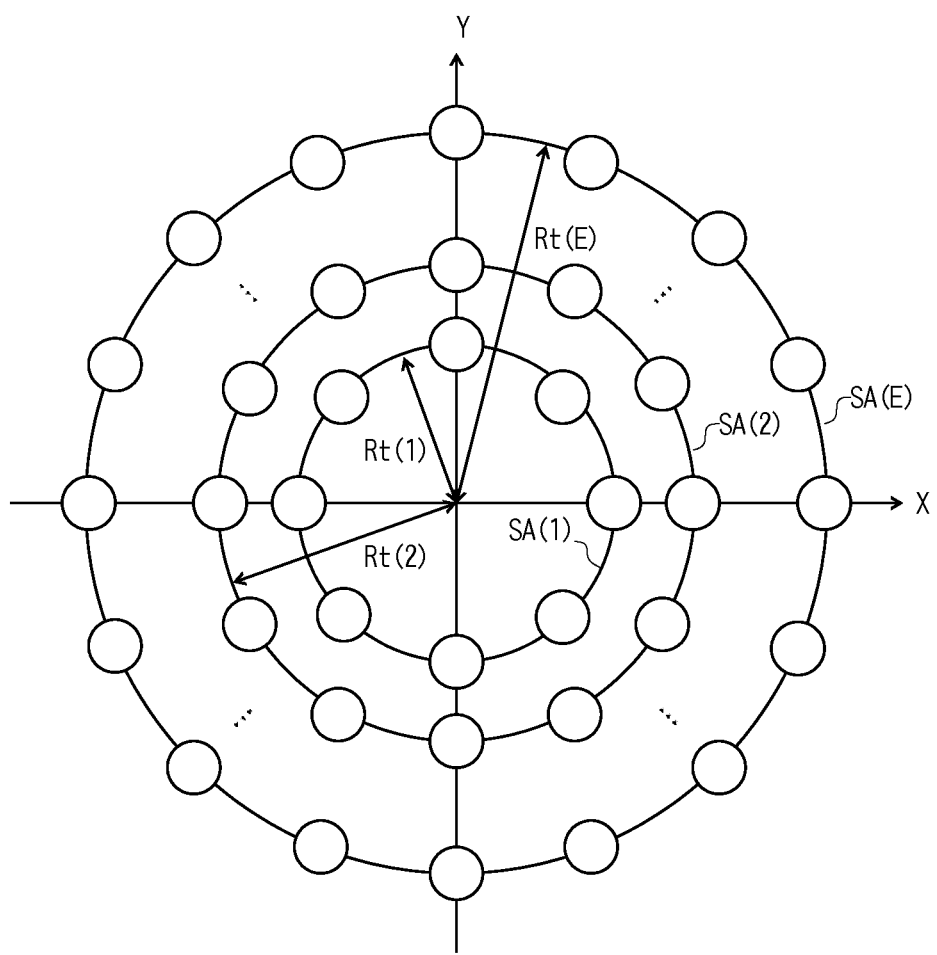
FIG. 6 is a diagram illustrating an example of multiple circular array antennae in a transmitting station illustrated in FIG. 5.

FIG. 6 illustrates an example of multiple circular array antennae in the transmitting station 100A illustrated in FIG. 5. As illustrated in FIG. 6, the Nt antenna elements ATx are disposed to form E circular array antennae SA (SA(1) to SA(E)). The respective E circular array antennae SA have different radii Rt (Rt(1) to Rt(E)), and are disposed in a concentric shape. For example, K(1) to K(E) antenna elements Atx are respectively disposed on a circumference at an equal interval in the circular array antennae SA(1) to SA(E). In other words, K(je) antenna elements Atx disposed in the circular array antenna SA(je) are disposed at an interval of an angle of 2π/K(je) (where je is an integer of 1 to E). In addition, Nt is a sum of K(1), K(2), . . . , and K(E). In FIG. 6, in the same manner as in FIG. 3, each of the Nt antenna elements ATx is indicated by a circular mark. The Nt antenna elements ATx may have any directivity and polarization characteristics.

The number E of the circular array antennae SA and the numbers K(1) to K(E) of antenna elements Atx included in each circular array antenna SA are preferably determined as appropriate according to a scale of the wireless communication system SYS1 or required communication quality.

A light collector such as a dielectric lens or a paraboloidal reflector having an optical axis in a direction in which an electromagnetic wave propagates may be disposed in at least one of the transmitting station 100A and the receiving station 200 illustrated in FIG. 5 such that electromagnetic waves radiated from the Nt antenna elements ATx are collected at a position of the receiving station 200, and are efficiently received by the Nr antenna elements ARx of the receiving station 200. Consequently, the wireless communication system SYS1 can suppress spreading of a beam pattern due to the Nt antenna elements ATx.

Figure 7:
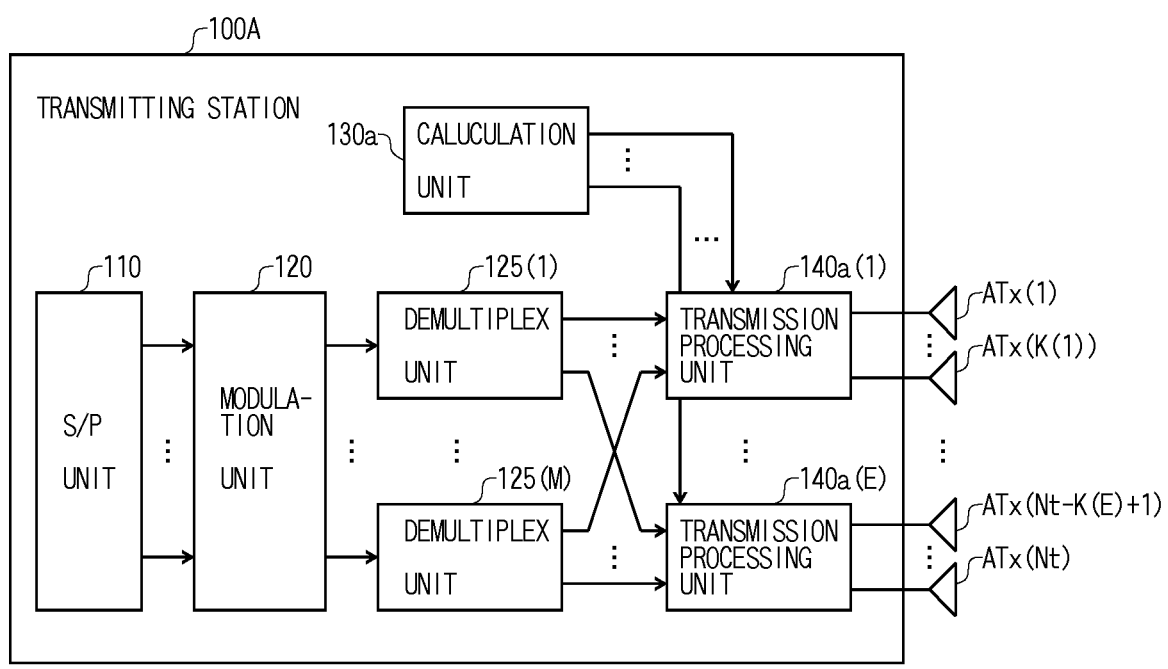
FIG. 7 is a diagram illustrating an example of the transmitting station illustrated in FIG. 5.

FIG. 7 illustrates an example of the transmitting station 100A illustrated in FIG. 5. In addition, elements having functions identical or similar to the elements described in FIG. 2 are given identical or similar reference numerals, and detailed description thereof will be omitted.

The transmitting station 100A includes an S/P unit 110, a modulation unit 120, M demultiplex units 125 (125(1) to 125(M)), a calculation unit 130a, E transmission processing units 140a (140a(1) to 140a(E)), and the Nt antenna elements ATx.

The modulation unit 120 performs modulation such as a PSK method or a QAM method on each of M parallel transmission bit strings received from the S/P unit 110, and thus generates M transmission signal sequences. The modulation unit 120 outputs the generated transmission signal sequences to the M demultiplex units 125, respectively. Here, an m-th transmission signal sequence output from the modulation unit 120 is transmitted by using the OAM mode $I_m$. The transmission process will be described later.

Each of the M demultiplex units 125 distributes the transmission signal sequences received from the modulation unit 120 to the E transmission processing units 140a, respectively.

The calculation unit 130a is a processor such as a CPU included in the transmitting station 100A, and calculates a weighting factor corresponding to each of the M transmission signal sequences modulated by the modulation unit 120 for each of the E sets of circular array antennae SA based on information indicating a wireless environment of the receiving station 200 that is a transmission destination of the transmission signal sequences. The calculation unit 130a outputs the calculated weighting factors to the respective E transmission processing units 140a. An operation of the calculation unit 130a will be described in FIG. 9.

The E transmission processing units 140a are respectively coupled to the circular array antennae SA(1) to SA(E) illustrated in FIG. 6. In other words, the transmission processing unit 140a(je) is coupled to K(je) antenna elements ATx included in the circular array antenna SA(je). The transmission processing unit 140a(je) executes a transmission process on the transmission signal sequences in the respective OAM modes $I_m$ received from the M demultiplex units 125, and radiates electromagnetic waves including the transmission signal sequences to the receiving station 200 via the circular array antenna SA(je). An operation of the transmission processing units 140a will be described in FIG. 8.

FIG. 8 illustrates an example of the transmission processing units 140a illustrated in FIG. 7. In FIG. 8, the transmission processing unit 140a(1) will be described, but the transmission processing units 140a(2) to 140a(E) are operated in the same manner as the transmission processing unit 140a(1).

The transmission processing unit 140a(1) illustrated in FIG. 8 includes M first OAM mode generation units 141a (141a(1) to 141a(M)), (L+1) multiplex units 142a (142a(1) to 142a(L+1)), (L+1) second OAM mode generation units 143 (143(1) to 143(L+1)), and K(1) second multiplex units 144 (144(1) to 144(K(1))).

Each of the M first OAM mode generation units 141a weights a transmission signal sequence $s_m$ in the OAM mode $I_m$ (where m is an integer of 1 to M) received from the demultiplex unit 125 by using the weighting factor calculated by the calculation unit 130a in the same manner as the OAM mode generation unit 141 illustrated in FIG. 2. Each of the M first OAM mode generation units 141a outputs the weighted transmission signal sequence $s_m$ to the respective (L+1) multiplex units 142a.

Each of the (L+1) multiplex units 142a multiplexes the transmission signal sequences weighted by the M first OAM mode generation units 141a, and outputs the multiplexed transmission signal sequences to the second OAM mode generation unit 143.

Each of the (L+1) second OAM mode generation units 143 executes a phase weighting process for transmitting the transmission signal sequences multiplexed by each of the (L+1) multiplex units 142 in a beam pattern in an OAM mode I' having a preset integer value by using the circular array antenna SA(1). Each of the (L+1) second OAM mode generation units 143 outputs the transmission signal sequences subjected to the phase weighting process to the second multiplex units 144 respectively coupled to the K(1) antenna elements ATx of the circular array antenna SA(1).

Each of the K(1) second multiplex units 144 multiplexes the transmission signal sequences received from the respective (L+1) second OAM mode generation units 143, and radiates the multiplexed transmission signal sequences with electromagnetic waves in the OAM mode I' to the receiving station 200 via the circular array antenna SA(1). Operations of the first OAM mode generation units 141a, the multiplex units 142a, the second OAM mode generation units 143, and the second multiplex units 144 will be described in FIG. 9.

Figure 9:
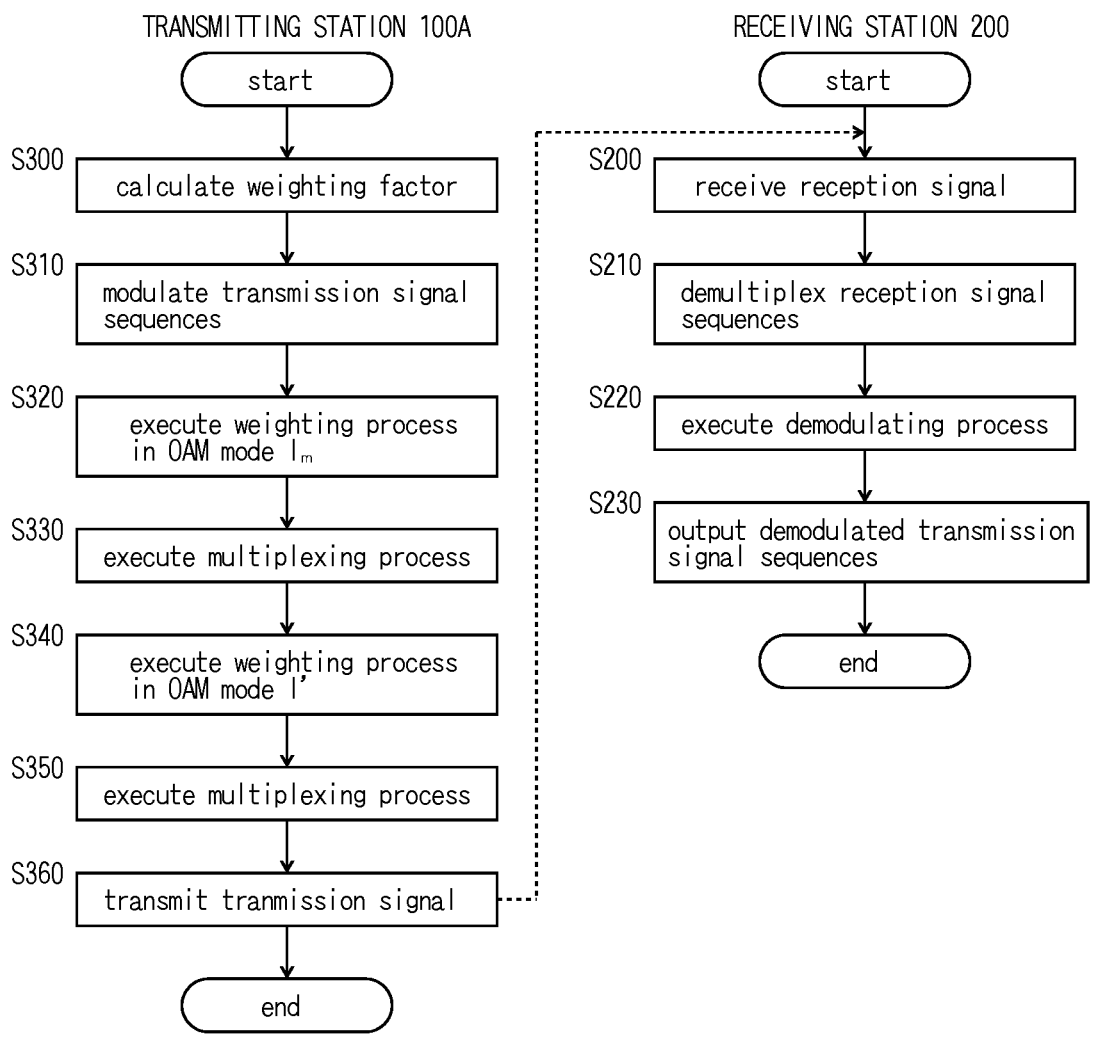
FIG. 9 is a diagram illustrating an example of a communication process in the wireless communication system illustrated in FIG. 4.

FIG. 9 illustrates an example of a communication process in the wireless communication system SYS1 illustrated in FIG. 5. Among operations in steps illustrated in FIG. 9, operations indicating processes identical or similar to those in steps illustrated in FIG. 4 are given identical step numbers, and detailed description thereof will be omitted. In the process illustrated in FIG. 9, processes in step S300 to step S360 are executed by the transmitting station 100A. Processes in step S200 to step S230 are executed by the receiving station 200. In other words, FIG. 9 illustrates another embodiment of a wireless communication method.

In the process illustrated in FIG. 9, a description will be made of an operation of the transmission processing unit 140a(1) coupled to the circular array antenna SA(1) of the transmitting station 100A illustrated in FIG. 6. However, the transmission processing units 140a(2) to 140a(E) are operated in the same manner as the transmission processing unit 140a(1), and detailed description thereof will be omitted.

In step S300, the calculation unit 130a calculates a weighting factor corresponding to each of transmission signal sequences in M OAM modes $I_m$ modulated by the modulation unit 120 for each circular array antenna SA, based on information indicating a wireless environment of the receiving station 200 that is a transmission destination of the transmission signal sequences.

Here, when a distribution equation (Equation (2)) of a beam formed in the transmitting station 100A is expanded by using the OAM mode I' having an integer value as a basic vector, Equation (2) is rewritten into Equation (7).

$$u_m(r, \phi, 0) = \sum_{i' \in integer} c_{i'}(l_m, r) \exp(i l' \phi) \quad (7)$$

Here, $c_{I'}(I_m, r)$ is an expansion factor with which the integer mode I in series expansion of the OAM mode $I_m$ is weighted. In addition, r indicates a function that changes in an r direction. In other words, $c_{I'}(I_m, r)$ is a function that changes only in the r direction.

The calculation unit 130a calculates a weighting factor $w_m$ by using Equations (7) and (8). Equation (8) represents the weighting factor $w_m$ for the circular array antenna SA(1) with the radius Rt(1).

$$w_m = (w_{m,Lmin}(Rt(1)), w_{m,Lmin+1}(Rt(1)), \ldots, w_{m,Lmin+L}(Rt(1)))^T = A_m(c_{Lmin}(I_m,(Rt(1)), c_{Lmin+1}(I_m, Rt(1)), \ldots, c_{Lmin+L}(I_m, Rt(1)))^T \quad (8)$$

Here, $A_m$ is any constant, and is determined as appropriate. Hereinafter, $A_m$ is set to "1". A value of L in the number (L+1) of the multiplex units 142a and the second OAM mode generation units 143 and a value of $L_{min}$ may be within an order of an integer-order OAM modes that can be radiated from the circular array antenna SA(1).

The calculation unit 130a outputs the weighting factor $w_m$ calculated for each circular array antenna SA to each of the transmission processing units 140a.

The information regarding the wireless environment of the receiving station 200 may be input in advance by a manager managing the wireless communication system SYS1, and may be stored in a storage device such as a hard disk device or a memory included in the transmitting station 100A.

Next, in step S310, the modulation unit 120 modulates each of the M transmission signal sequences received from the S/P unit 110. The modulation unit 120 outputs the transmission signal sequences $s_m$ in the M OAM modes $I_m$ to the E transmission processing units 140a respectively via the M demultiplex units 125.

Next, in step S320, the first OAM mode generation unit 141a(m) of the transmission processing unit 140a(1) executes a weighting process on the transmission signal sequence $s_m$ in the OAM mode $I_m$ modulated in step S310 by using the weighting factor $w_m$ in Equation (8) calculated in step S300 (where m is an integer of 1 to M). The first OAM mode generation unit 141a(m) outputs the weighted transmission signal sequence $w_{m,Lmin+j} \cdot s_m$ to each of the multiplex units 142a(j+1) (where j is an integer of 0 to L).

Next, in step S330, the multiplex unit 142a(j+1) multiplexes the transmission signal sequences $w_{m,Lmin+j} \cdot s_m$ weighted by the respective first OAM mode generation units 141a(m) in step S320 by using Equation (9). The multiplex unit 142a(j+1) outputs the multiplexed transmission signal sequences $s'_{Lmin+j}$ to the second OAM mode generation unit 143(j+1).

$$s'_{Lmin+j} = \sum_{m=1}^{M} w_{m,Lmin+j} \cdot s_m \quad (9)$$

Next, in step S340, the second OAM mode generation unit 143(j+1) executes a phase weighting process for transmitting the transmission signal sequences $s'_{Lmin+j}$ multiplexed in step S330 in an OAM mode I' having an integer value by using the circular array antenna SA(1). In other words, the second OAM mode generation unit 143(j+1) multiplies the multiplexed transmission signal sequences $s'_{Lmin+j}$ by phase weights $\theta_{I',ka}$ (=exp(i2πI'·ka/K(1))) corresponding to the K(1) antenna elements of the circular array antenna SA(1) (where ka is an integer of 1 to K(1), and I'∈{$L_{min}, L_{min+1}, \ldots, L_{min+L}$}).

The second OAM mode generation unit 143(j+1) outputs the transmission signal sequence $\theta_{I',ka} \cdot s'_{Lmin+j}$ subjected to phase weighting to the second multiplex unit 144(ka) coupled to the antenna element ATx(ka).

Next, in step S350, the second multiplex unit 144(ka) receives the transmission signal sequences $\theta_{I',ka} \cdot s'_{Lmin+j}$ subjected to phase weighting in step S340 from the second OAM mode generation unit 143(j). The second multiplex unit 144(ka) multiplexes the received transmission signal sequences $\theta_{I',ka} \cdot s'_{Lmin+j}$ by using Equation (10). Equation (10) is rewritten by using Equation (7). In Equation (10), j'=I'=$L_{min}$+j.

$$ss_{ka} = \sum_{j=Lmin}^{Lmin+L} \theta_{I',ka} \cdot s'_j \quad (10)$$

$$= \sum_{j'=Lmin}^{Lmin+L} \theta_{j',ka} \sum_{m=1}^{M} w_{m,j'} \cdot s_m =$$

$$\sum_{m=1}^{M} \left\{ \sum_{j'=Lmin}^{Lmin+L} \exp\left(\frac{i2\pi \cdot j' \cdot ka}{K(1)}\right) \cdot c_{j'}(l_m, Rt(1)) \right\} s_m$$

$$\cong \sum_{m=1}^{M} u_m\left(Rt(1), \frac{2\pi \cdot ka}{K(1)}, 0\right) \cdot s_m$$

In step S360, the second multiplex unit 144(ka) outputs a transmission signal sequence $ss_{ka}$ obtained through multiplexing in step S350 to the antenna element ATx(ka), and transmits a transmission signal of the multiplexed transmission signal sequence $ss_{ka}$ to the receiving station 200. Through the process illustrated in FIG. 9, in the same manner as in the embodiment, a beam in which a plurality of modes are multiplexed is generated in the receiving station 200.

The transmitting station 100A finishes the transmission process. When a transmission signal sequence is received from the outside, the transmitting station 100A repeatedly executes the processes in step S300 to step S360. The process in step S300 may be executed initially only once, and may be omitted for the second and subsequent times.

The process in the receiving station 200 illustrated in FIG. 9 is the same as the process illustrated in FIG. 4, and thus detailed description thereof will be omitted.

In the embodiment illustrated in FIGS. 5 to 9, the transmitting station 100A sends respective transmission signal sequences in M OAM modes $I_m$ having real number values smaller than 1 as an interval between modes, multiplexes the transmission signal sequences modulated in the M OAM modes $I_m$, and transmits the multiplexed transmission signal sequences to the receiving station 200. In other words, when a range of an OAM mode for transmission is identical, the transmitting station 100A can modulate transmission signal sequences in more OAM modes $I_m$ than when a plurality of OAM modes are set at an interval of an integer value by using the M OAM modes $I_m$ including a non-integer order set to an interval smaller than 1 and an integer order. An absolute value of the OAM mode $I_m$ is set to a small value, and thus the transmitting station 100A can suppress spreading of a beam pattern due to the Nt antenna elements ATx.

For example, in the related art such as Non-Patent Document 4, even when of OAM modes enabling reception power required for communication to be secured have limits of five-mode multiplex such as −2, −1, 0, 1, and 2, the transmitting station 100A can realize nine-mode multiplex such as −2.0, −1.5, −1.0, −0.5, 0, 0.5, 1.0, 1.5, and 2.0 as OAM modes, and can thus increase a multiplex number to 1.8 times.

The receiving station 200 executes phase rotation in a phase amount corresponding to the OAM mode $I_m$ on a received signal that is received from the transmitting station 100A, combines received signals that are received with each other in phase, and can thus separate signals in the respective OAM modes $I_m$. As mentioned above, the wireless communication system SYS1 can multiplex electromagnetic waves in a larger number of OAM modes than in the related art while suppressing spreading of a beam pattern, and can thus improve throughput.

The wireless communication system SYS1 can be realized by multiplexing transmission signal sequences in the M OAM modes $I_m$ having different real number values before multiplexing the transmission signal sequences in OAM modes I' having integer values by using an existing wireless communication system having a plurality of circular array antennae radiating electromagnetic waves of the plurality of OAM modes I' having different integer values. In other words, the wireless communication system SYS1 can be realized at low cost by using the existing wireless communication system, and can improve throughput.

The features and advantages of the embodiments are apparent from the above detailed description. This intends that the claims cover the features and the advantages of the above-described embodiments within the scope without departing from the concept and claimed scope thereof. A person skilled in the art can easily conceive of all modifications and changes. Therefore, the scope of embodiments having the inventiveness is not intended to be limited to the above embodiments, and it is possible to rely on appropriate modifications and equivalents included in the scope disclosed in the embodiments.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. A wireless communication device comprising:
   a plurality of antenna elements;
   a modulation unit modulating signals including data in a plurality of first orbital angular momentum (OAM) modes, where the plurality of first orbital angular momentum (OAM) modes are real values different from each other and intervals between each of the real values is less than one;
   a calculation unit calculating factors indicating weights corresponding to each of the signals in the plurality of first OAM modes modulated by the modulation unit for each of the plurality of antenna elements, based on information indicating a wireless environment of a counter wireless communication device that is a transmission destination of the data; and
   a transmission processing unit multiplexing each of the signals in the plurality of first OAM modes for each of the plurality of antenna elements by using the factors, and outputting the signals obtained through multiplexing for each of the plurality of antenna elements to each of the plurality of antenna elements.

2. The wireless communication device according to claim 1, further comprising:
   a reception processing unit subjecting a received signal which is received from the counter wireless communication device to phase rotation in a phase amount corresponding to each of the plurality of first OAM modes, and demultiplexing the received signal into each of signals in the plurality of first OAM modes; and
   a demodulation unit demodulating the demultiplexed signals in the plurality of first OAM modes.

3. The wireless communication device according to claim 1 or 2, further comprising
   a light collector collecting electromagnetic waves radiated from the plurality of antenna elements at a position of the counter wireless communication device.

4. The wireless communication device according to claim 1 or 2, wherein
   the plurality of antenna elements form a plurality of circular array antennae disposed in a concentric shape on a two-dimensional plane perpendicular to a direction in which the counter wireless communication device is provided.

5. The wireless communication device according to claim 4, further comprising
   a plurality of the transmission processing units being disposed for each of the plurality of circular array antennae, wherein:
   the calculation unit calculates the factors for each of the plurality of circular array antennae, and
   each of the plurality of transmission processing units multiplexes each of the signals in the plurality of first OAM modes for each of the disposed circular array antennae by using the factors, and executes weighting of a phase corresponding to a second OAM mode having an integer value, set in the disposed circular array antenna, on the multiplexed signals.

6. A wireless communication method for a wireless communication device including a plurality of antenna elements, the wireless communication method comprising:
   modulating signals including data in a plurality of first OAM modes, where the plurality of first orbital angular momentum (OAM) modes are real values different from each other and intervals between each of the real values is less than one;
   calculating factors indicating weights corresponding to each of the modulated signals in the plurality of first OAM modes for each of the plurality of antenna elements, based on information indicating a wireless environment of a counter wireless communication device that is a transmission destination of the data; and
   multiplexing each of the signals in the plurality of first OAM modes for each of the plurality of antenna elements by using the factors, and outputting the signals obtained through multiplexing for each of the plurality of antenna elements to each of the plurality of antenna elements.

* * * * *